(12) United States Patent
Lewis

(10) Patent No.: US 9,277,271 B2
(45) Date of Patent: Mar. 1, 2016

(54) WIRELESS NETWORK ANTENNA APPARATUS AND METHOD

(75) Inventor: Richard Lewis, Buffalo Grove, IL (US)

(73) Assignee: Zenith Electronics LLC, Lincolnshire, IL (US)

(*) Notice: Subject to any disclaimer, the term of this patent is extended or adjusted under 35 U.S.C. 154(b) by 0 days.

(21) Appl. No.: 13/403,507

(22) Filed: Feb. 23, 2012

(65) Prior Publication Data

US 2013/0227619 A1 Aug. 29, 2013

(51) Int. Cl.
| | |
|---|---|
| *H04N 7/20* | (2006.01) |
| *H04N 21/4363* | (2011.01) |
| *H01Q 1/00* | (2006.01) |
| *H04N 21/41* | (2011.01) |
| *H04N 21/426* | (2011.01) |
| *H04N 21/436* | (2011.01) |
| *H04N 21/462* | (2011.01) |
| *H04N 21/61* | (2011.01) |
| *H04N 21/643* | (2011.01) |
| *H01Q 1/44* | (2006.01) |
| *H01Q 3/26* | (2006.01) |

(52) U.S. Cl.
CPC ......... *H04N 21/43637* (2013.01); *H01Q 1/007* (2013.01); *H01Q 1/44* (2013.01); *H01Q 3/2605* (2013.01); *H04N 21/4126* (2013.01); *H04N 21/42607* (2013.01); *H04N 21/43615* (2013.01); *H04N 21/4622* (2013.01); *H04N 21/6112* (2013.01); *H04N 21/64322* (2013.01)

(58) Field of Classification Search
CPC ................................................ H04N 21/4126
USPC .......... 725/73, 48, 51, 23, 74, 78, 81; 455/19, 455/25, 74.1, 77, 88, 90.3
See application file for complete search history.

(56) References Cited

U.S. PATENT DOCUMENTS

| | | | | |
|---|---|---|---|---|
| 4,591,906 | A | * | 5/1986 | Morales-Garza et al. ....... 725/24 |
| 5,617,151 | A | * | 4/1997 | Lee ................................ 348/731 |
| 5,793,413 | A | * | 8/1998 | Hylton et al. .................... 725/81 |
| 5,797,083 | A | * | 8/1998 | Anderson ........................ 455/25 |
| 5,835,128 | A | * | 11/1998 | Macdonald et al. ............ 725/81 |
| 5,883,677 | A | * | 3/1999 | Hofmann ........................ 348/584 |
| 5,983,071 | A | * | 11/1999 | Gagnon et al. .................. 725/72 |
| 5,990,883 | A | * | 11/1999 | Byrne et al. .................... 715/721 |
| 6,031,878 | A | * | 2/2000 | Tomasz et al. ................. 375/316 |
| 6,130,726 | A | * | 10/2000 | Darbee et al. .................. 348/734 |
| 6,154,204 | A | * | 11/2000 | Thompson et al. ............. 375/214 |

(Continued)

FOREIGN PATENT DOCUMENTS

CN 201936995 U * 8/2011

*Primary Examiner* — Pankaj Kumar
*Assistant Examiner* — Timothy Newlin

(57) ABSTRACT

An antenna for broadcast television programming includes a tuner and demodulator located with the antenna to generate a demodulated television program stream. A network interface is connected to the tuner and demodulator to provide the television program stream to a network, preferably a wireless network. A television set located remotely from the antenna receives the television program stream via the network and displays the program. A portable control device may be connected to the network. Reception of the broadcast programming is improved by controlling the directionality of the antenna in response to the demodulated signal. A service provider may poll the wireless network antenna to determine which broadcast programs are received and may provide extended programming television programs to the user by an internet connection to the user's network.

16 Claims, 6 Drawing Sheets

(56) References Cited

U.S. PATENT DOCUMENTS

| | | | |
|---|---|---|---|
| 6,526,580 B2 * | 2/2003 | Shimomura et al. | 725/63 |
| 6,714,759 B2 * | 3/2004 | Perry et al. | 455/3.02 |
| 6,889,385 B1 * | 5/2005 | Rakib et al. | 725/119 |
| 7,130,576 B1 * | 10/2006 | Gurantz et al. | 455/3.02 |
| 7,457,585 B2 * | 11/2008 | Katoh | 455/41.2 |
| 7,634,794 B1 * | 12/2009 | Paik et al. | 725/62 |
| 7,949,341 B2 * | 5/2011 | Wessel van Rooyen | 455/452.1 |
| 7,954,127 B2 * | 5/2011 | James et al. | 725/81 |
| 7,979,882 B2 * | 7/2011 | Choi et al. | 725/62 |
| 7,991,426 B2 * | 8/2011 | van Rooyen | 455/552.1 |
| 8,009,742 B2 * | 8/2011 | Kim et al. | 375/240.28 |
| 2002/0083458 A1 * | 6/2002 | Henderson et al. | 725/72 |
| 2002/0104082 A1 * | 8/2002 | Fries | 725/32 |
| 2002/0174444 A1 * | 11/2002 | Gatto et al. | 725/133 |
| 2004/0060065 A1 * | 3/2004 | James et al. | 725/71 |
| 2004/0248517 A1 * | 12/2004 | Reichgott et al. | 455/63.4 |
| 2006/0212910 A1 * | 9/2006 | Endres et al. | 725/73 |
| 2007/0124765 A1 * | 5/2007 | Bennett et al. | 725/38 |
| 2007/0223380 A1 * | 9/2007 | Gilbert | H04L 45/24 370/235 |
| 2008/0022323 A1 * | 1/2008 | Koo | 725/81 |
| 2008/0034096 A1 * | 2/2008 | Tourzni | H04N 5/4401 709/227 |
| 2008/0060024 A1 * | 3/2008 | Decanne | 725/72 |
| 2008/0261512 A1 * | 10/2008 | Milbrandt et al. | 455/3.02 |
| 2009/0077605 A1 * | 3/2009 | Kurita et al. | 725/116 |
| 2012/0151542 A1 * | 6/2012 | Shafrir et al. | 725/109 |
| 2012/0270576 A1 * | 10/2012 | Herrington | H04L 65/4076 455/466 |

* cited by examiner

WIRELESS NETWORK ANTENNA APPARATUS AND METHOD

BACKGROUND OF THE INVENTION

1. Field of the Invention

The present invention relates generally to an antenna for receiving broadcast televisions signals, and more particularly to a steerable television antenna coupled to a network interface.

2. Description of the Related Art

Currently, many people are considering "cutting the cord" to traditional television programming providers such as cable television companies or satellite television providers. They are considering this for a variety of reasons such as a limited interest in television viewing or the expense of the programming. Television programs obtained via cable companies or satellite television providers are currently bundled into packages made up of many channels in each bundle, and an individual may only watch 10 channels, for example, but must subscribe to costly packages with many more channels, often involving subscribing to multiple bundles, in order to get the few channels that they watch.

Content or service providers are exploring how to provide a more targeted offering by providing television content via an internet connection to the user's television, but traditional business models are preventing innovation in this area. Local network programming remains one of the most popular sources of content for television viewers, but widespread deployment of the local programming over the internet is prohibited due to advertising rights and other business issues.

Combining an over-the-air approach with internet transmission of programming presents a dilemma because reliable indoor reception of digital over-the-air signals in all conditions remains elusive.

Traditionally, the television and television antenna have been linked over traditional RF interfaces. Steering systems and diversity have been used to augment reception but have had limited success. In set top box approaches, the reception function has been removed from the display device but the physical antenna remains tethered to the reception function over the traditional RF connection. Technical developments and maturity of the necessary technology have advanced so that a new approach to a television reception system is now possible. The present invention provides an apparatus and method which separate the television signal reception, tuning and demodulation functions from the rest of the television set.

SUMMARY OF THE INVENTION

The present invention provides an apparatus and method for providing television programming to a user that utilizes a remote antenna for reception of broadcast signals, a tuner and demodulator located at the antenna, and a network connection from the antenna unit to provide the television programming to a television set over a network connection. An example of a network connection is a wireless network connection from the tuner and demodulator at the antenna to the television display to wirelessly provide the desired programming to the television for viewing. The wireless network may be an existing wireless network in the user's home or may be established by the wireless network antenna device. In an example of the wireless antenna, the antenna is located in or near a user's home, yet remote from the television set. The operation of the antenna may be controlled in response to signals from the tuner and demodulator.

DETAILED DESCRIPTION OF THE PREFERRED EMBODIMENTS

Figure 1:
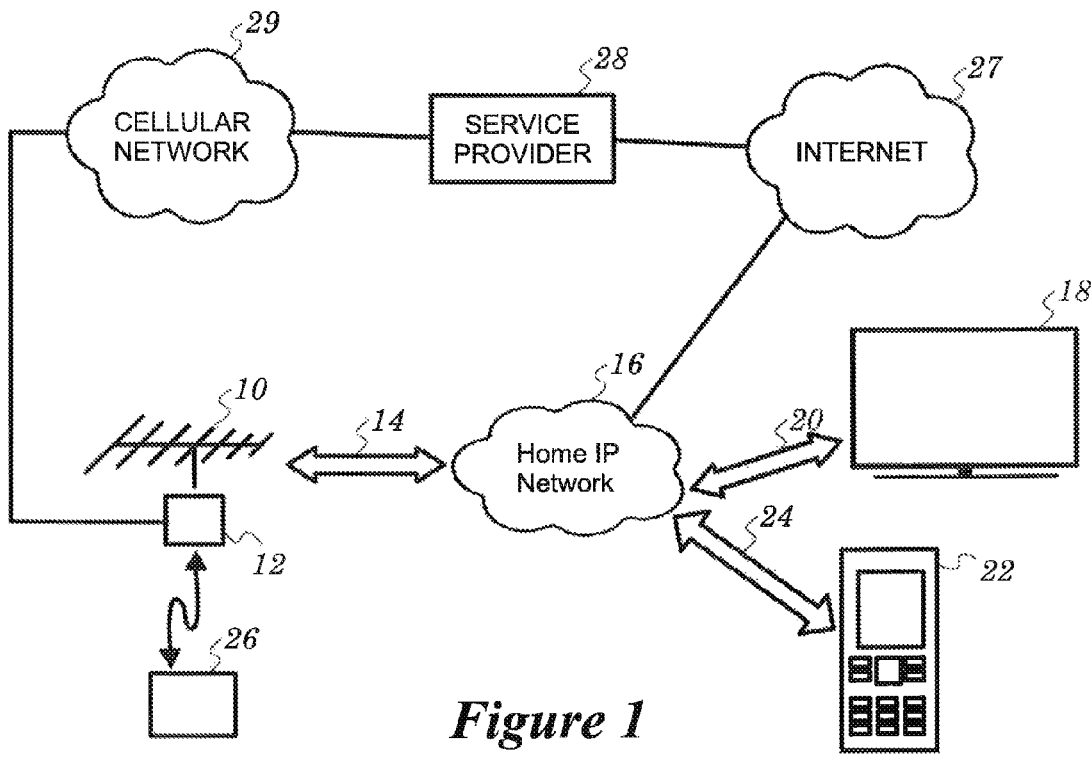
FIG. 1 is a schematic diagram of a home television reception system according to an embodiment of the present invention.

Referring first to FIG. 1, a preferred embodiment of an apparatus and method according to the principles of the present invention provides an antenna 10 configured to receive broadcast television signals. The antenna 10 may be any type of antenna but in a preferred embodiment is an antenna capable of directional reception such as a rotatable antenna or an electronically controlled antenna.

The antenna 10 is co-located with an antenna base unit 12 that in a preferred embodiment includes a directional control, a television tuner and demodulator and a wireless network interface, as will be discussed in more detail hereinafter. The antenna 10 receives a broadcast television signal, which is provided to the tuner and demodulator portion to tune and decode the programming on the desired channel. The decoded signal, which may comprise, for example, an MPEG-2 transport stream is transmitted at 14 via a wireless home IP network 16. The home network 16 in one embodiment may be a Wi-Fi network established by the operation of a Wi-Fi wireless router device. The router device may be a component of the antenna base unit 12 or may be an existing router provided in the home. Other types of networks are also possible, including LAN, WAN, wired networks, combination wired and wireless networks, cellular, WiMAX and others. The home network 16 need not be in a home, but could be located anywhere.

Devices within the home, such as a television set or other display device 18, access the wireless network 16 via a network connection 20 so as to receive the television programming provided via the network 16 from the antenna 10 and display the television program for viewing by a user. The television set or display device 18 may include a network adapter to directly connect to the network 16 or may be used with an external network adapter device which connects to the network 16 and provides the programming signal to the television 18. The television set or display device 18 may be a traditional television set, a television set configured to receive signals carried by a wireless network, a computer monitor, a flat screen display, or other type of display device or medium. Multiple television sets may be connected to the network 16, for example at different locations within the home or for viewing different programming within a common area. The environment in which the network 16 and display device 18 is provided may be a user's home, but could also be a business, recreational facility, public place, or other location.

Devices other than the television set 18 can also access the network 16. For example, a handheld device 22 accesses the network 16 via a network connection 24. The handheld device 22 may be a smart phone, PDA, laptop computer, notebook computer, tablet computer, netbook computer, programmable remote control, portable music player, or other device. The device 22 can also be a desktop computer, workstation, kiosk or other stationary device and need not be handheld or particularly portable. The device 22 includes a network adapter to enable communication to the network 16, such as a Wi-Fi adapter to enable two-way communication between the device 22 and other devices connected to the network 16. The device 22 may receive television programming via the network, such as provided by the antenna 10. The devices 22 or 18 may control the tuner in the base unit 12 such as by sending control signals over the network 16 from the device 22 or 18 to the base unit 12 for tuning selected television channels. It is also contemplated that the device 22 or 18 may control the tuner by transmitting control signals directly to the tuner in the base unit 12, rather than through the network 16. Alternatively or in addition, a separate control device 26, which may transmit IR or RF control signals, may be used to directly control the tuner in base unit 12 for tuning selected television channels for transmitting over the network 16.

In the present wireless network antenna (WNA) invention, the physical antenna 10, as well as the tuning and demodulation functions provided within the unit 12 are co-located in the same physical location but are separate from the display device or television 18. The antenna and tuner and demodulation functions can be enclosed within a single housing according to one embodiment or the antenna 10 and the base unit 12 can be in separate housings or structures disposed near one another. The wireless network antenna (WNA) 10 and base unit 12 delivers an MPEG-2 transport stream containing the desired television programming to a network interface (such as an IP network, a power line, etc.) 46 (see FIG. 2) to be distributed over the network 16 to the display devices 18 or 22. The network interface 46 may be located in or near the housing of the base unit 12. As such, the network interface 46 is also co-located with the antenna 10 and demodulator.

The close positioning (co-location) of the antenna, tuner and demodulator to one another has a number of advantages—the separation of the receiving and display functions allows the reception function to be placed at an independent location from that of the display device location so that both functions may be optimized for location. Further, coupling the tuning and demodulation functions close to the antenna system creates cost and performance improvements that are not possible under the conventional approach. This approach also facilitates improved technique for steering or directionally controlling the antenna 10 that are not practical in conventional approaches. One such technique includes using information from the demodulation equalizer taps to steer the antenna.

Also shown in FIG. 1 is a system for receiving and viewing television programming that may not be broadcast locally for reception by the antenna 10. The home IP network 16 is connected to the Internet 27 so as to receive television programming that may be available via the Internet 27. Some television programming, such as premium channels, foreign language channels, sports channels, or special interest channels, for example, may be provided to the user via the Internet 27 by a service provider 28. The service provider 28 offers the additional programming to the user for programming that is not available for reception via the antenna 10. The service provider 28 may communicate with the tuner and demodulator in the base unit 12 to determine which programming is available at the user's location for reception by the antenna 10. One such communication channel is via a cellular telephone network 29. Another communication channel could be over the Internet 27 and into the home IP network 16 to the base unit 12 via the network connection 14. The cellular telephone network 29 or the IP network 16 enables the service provider 28 to contact the base unit 12 so as to determine if the antenna 10 is receiving the desired local broadcast channels. If the local channels are being received by the antenna 10, the user is a candidate for the eliminating cable television service or satellite television service and replacing it with a system that includes the antenna 10 and base unit 12 to receive local broadcast programming and that uses the Internet 27 or other network connection into the user's home IP network 16 to receive desired premium channel programming or other programming as desired by the user. The present system thereby provides a replacement for cable or satellite television service.

One embodiment of the present invention provides a method for providing television service as is apparent from FIG. 1. A service provider 28 offers to the user a replacement television service wherein local broadcast programming is received via the antenna 10 and the base unit 12 for transmittal over the user's home network 16 to viewing devices such as the television 18 or portable device 22 and wherein programming that is not available for reception by the antenna 10 is provided or made available by the service provider 28 to the user's network 16 over a network connection controlled by the service provider 28. Since reception of the desired local broadcast programming is location dependent, after the antenna 10 is positioned, the service provider 28 is able to communicate with the antenna and base unit 12 to determine which local channels are received. The service provider 28 may initiate the communication by sending an inquiry to the base unit 12 or the base unit may self-initiate the communication to the service provider. The service provider 28 can determine if the user is a candidate for the television service wherein local programming is received by the antenna and other programming is received by a network connection. If the desired local channels are capable of being received by the antenna 10, the service provider 28 can provide the non-local channels via the network. If the desired local channels are not capable of being received by the antenna 10, the service provider may suggest locating the antenna 10 in a different location or orienting it in a different position or may control the antenna to better receive the programming. The service provider 28 may replace the antenna 10 with a different antenna better able to receive the desired local programming.

As a result of the feedback provided by the cellular network 29 or the Internet 27 through the communication channel between the service provider 28 and the base unit 12, the service provider 28 may collect channel reception information from a plurality of users and from this information derive information on coverage areas of local broadcast programming. With this information, the service provider 28 may be able to inform a potential new customer of the television service that the potential customer's location is within a reception area for local broadcast programming and thus is able to use the alternate television service according to the present apparatus and method, or alternately the service provider is able to inform the prospective customer that their location is outside the reception area for desired local broadcast programming so that the present television system and method will not provide local programming via the antenna 10. The location information for the antenna 10 and base unit 12 may be determined by address information, by GPS information or other location information. The service provider 28 uses the location information to map the areas for prospective customers enabling directed sales and avoiding disappointment for prospective customers outside of broadcast coverage areas.

Figure 2:
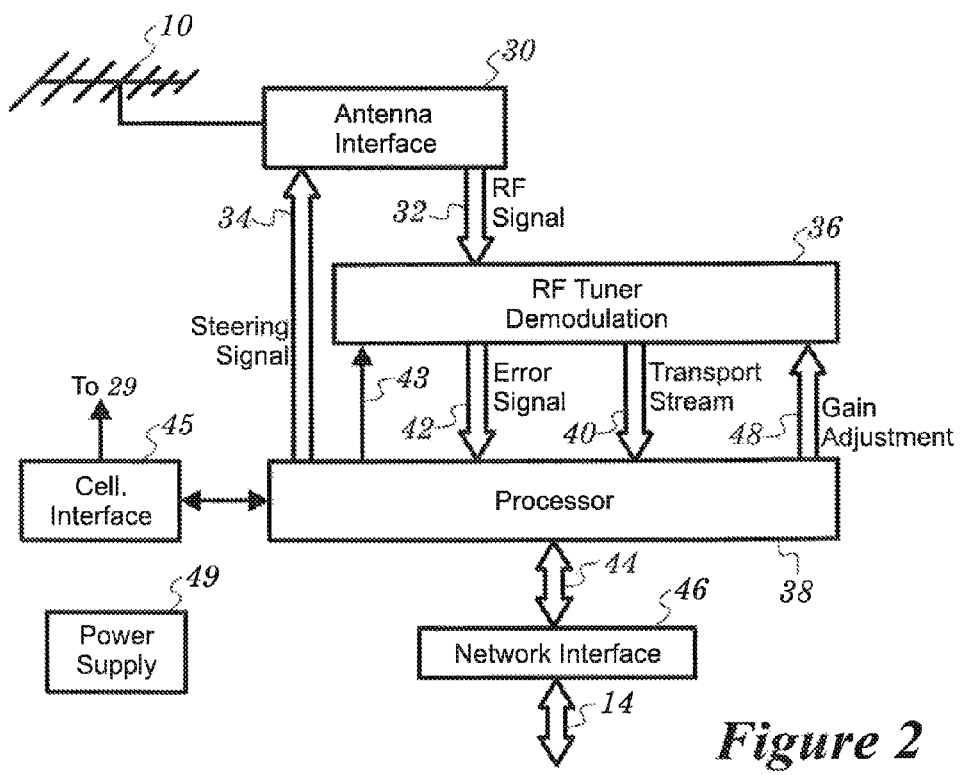
FIG. 2 is a functional block diagram of an antenna and communication apparatus of the home television reception system of FIG. 1.

FIG. 2 shows the elements of an embodiment of the wireless network antenna (WNA). The antenna 10 is connected to an antenna interface 30 that includes a traditional RF (radio frequency) connection 32 plus an input for a steering signal 34 that provides the ability to "steer," such as electronically or by changing the physical position of the antenna, or to shape the reception pattern of the antenna 10, based on reception information from a tuner demodulation component or section 36, via a processor 38 according to the illustrated embodiment. The steering function according to one embodiment may be similar to the controls according to the CEA-909A "Antenna Control Interface" standard.

The tuner demodulation section 36 tunes and demodulates the television signal of a selected television channel to provide a transport stream 40 to the processor 38 along with reception and error information 42. It will be understood the demodulation operation of module 36 includes all of the channel decoding and error correction functions of the type set forth in the ATSC standard for broadcast digital television. By co-locating the tuner and demodulation section 36 with the antenna 10, either within the same housing or adjacent each other, the possible need for additional gain at the antenna is eliminated by the short signal path between the antenna 10 and the tuner and demodulator 36 and the use of the inherent gain of the tuner demodulator 36, resulting in cost savings as well as improved signal-to-noise performance. The processor 38 can be a low cost device as it does not need to support all the functions of a normal television. The processor 38 of a preferred embodiment learns and holds the channel map and the tuning parameters of the tuner demodulator 36, receives tuning control signals from the device 18, 22 or 26 and controls the tuning operation of the tuner module 36 via a tuner control 43 to tune the selected channel. The processor 38 may also receive the demodulated transport stream 40 from the RF tuner demodulation module 36 and package it for a network interface 46 by adding an IP protocol layer as is well known in the art and coupling the signal at 44 to the network interface 46. The signal is then streamed to, for example, the television 18 or the device 22 over the IP network 16. As this is free "over the air" content, complicated digital rights management protocols are not required.

The processor 38 outputs a steering signal 34 to the antenna interface 30 by which the parameters, such as the gain and directionality of the antenna are controlled for improving the reception of the broadcast signal. The steering control signals 34 are generated by the processor 38 in response to analysis of the demodulated transport stream 40 and/or the error signal 42 using any of a number of algorithms well known in the art and may be fixed parameters for a given channel or may vary dynamically in real time. Due to the structure of the apparatus according to a preferred embodiment of the invention this ability to vary the steering parameters dynamically in real time is enhanced over conventional approaches such as shown CEA-909. As noted before, the antenna 10 may be physically moved, such as by a motor, servo or other drive mechanism, or the antenna may be stationary with a steerable directionality gain that can be changed electronically, such as in a phased array antenna or other antenna configuration. It is possible in some embodiments to provide an omnidirectional antenna. A gain adjustment signal 48 is provided by the processor 38 to the tuner demodulator 36 by which the tuner demodulator 36 adjusts the gain of the signal stream. Also, the processor 38, the network interface 46, the tuner demodulator 36 and the antenna interface 30 may be contained in a single or multiple adjacent housings co-located with antenna 10.

The cellular network 29 of FIG. 1 communicates with the base unit 12 by a cellular interface 45. The cellular interface 45 may be connected to, for example, the processor 38 which enables information on received broadcast programming to be transmitted to the cellular network 29, either by the processor 38 acting on its own or in response to a query from the service provider 28. Other information or commands, such as activation commands, from the service provider may be transferred via the cellular interface 45. Although wireless communication via a mobile telephone network, such as a cellular telephone network is disclosed in this embodiment between the base unit 12 and the service provider 28, other communication paths for example the internet 27 are also possible and may be preferred for cost reasons.

A power supply 49 such as a power supply connected to line power or a battery-based power supply, is provided for the wireless network antenna, as will be understood by those of skill in this art. Other components as necessary for the operation of the device are also provided.

The network interface 46 can be any of a number of different approaches that fit with the topology of the user's network such as Wi-Fi, Cat 5 network cable, USB network connection, or other wired and wireless approaches like Bluetooth wireless connectivity, depending on the required bandwidth. The network interface 46 in some installations provides connectivity to the Internet. The network interface 46 can connect into an existing household network or can itself establish a network within the home.

The output 14 of the network interface 46 provides the television signal to the network 16 in a format that the television set 18 can receive and display. As noted above, this is in one embodiment an MPEG-2 transport stream with an IP layer, although other signal formats are also possible. The network interface 46 need not be limited to terminating into a traditional television 18 but could also be interfaced to an Android application on a cell phone, for example, or other device 22. The operating system of the device 22 can include Windows, Android, iOS, Linux, or other operating systems. An application or other control program may be provided in any computer language. These types of devices 22 are used in selected embodiments of the invention to support remote tuning of the tuner 36 or even remote decoding of the content of the received signal 32 using the hand held device 22.

The wireless network antenna (WNA) could be further integrated into a home's décor by the addition of enhanced functionality such as by incorporating energy efficient LED lighting in the antenna 10 or in the antenna base unit 12. Having the wireless network antenna (WNA) device housed in an attractive housing or configuration, such as having an industrial designed unit or a contemporary designed unit, which is capable of sitting on a table in the living room or other room of the house, for example, next to a window, provides the ability to receive broadcast signals without antenna connections. By providing a reading lamp as a functional part of the wireless antenna system, the system also provides off-the-air reception would be an embodiment having a mixed use.

Figure 3:
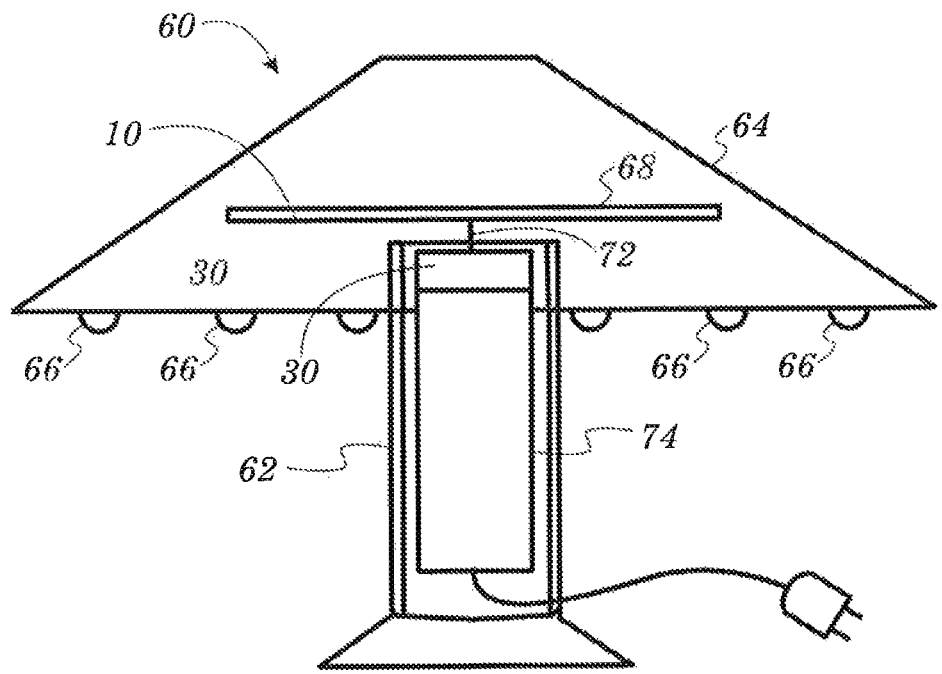
FIG. 3 is a side cross-sectional view of a lamp having an antenna and a tuner and demodulator module within the lamp.

An example of a wireless network antenna and lamp combination is shown in FIG. 3. The lamp 60 has a lamp base 62 and a lamp shade 64. Within the lamp shade 64 is mounted one or more light sources 66, such as incandescent bulbs, fluorescent bulbs, compact fluorescent bulbs, LED lights, tungsten bulbs, or other light sources. In one embodiment, the lamp shade 64 encloses the antenna 10. The antenna 10 of the illustrated embodiment includes horizontal antenna elements 68 disposed to receive broadcast television signals. The antenna 10 of a preferred embodiment is electronically steerable to provide improved reception of the television signal. One such means of steering the antenna 10 is to connect the antenna elements 68 through a connection 72 70 to the antenna interface 30 which electronically directs the reception direction of the antenna 10. The antenna interface 30 is disposed within the base 62 of the lamp 60. The base 62 also preferably houses the electronics 74 of the base unit 12, including the tuner and demodulator 36, processor 38 and network interface 46 along with the communication and power modules. The antenna 10 may be steered automatically in response to the steering signal 34 as previously described to achieve improved signal reception, or may be steered under user control.

The power supply to the lamp 60 such as a connection to a wall outlet for line power, may also power the electronics 74 within the lamp. The network interface 46 of electronics 74 wirelessly transmits the IP formatted television signal onto the home IP network 16 so that a television 18 or other viewing device can receive the television programming. As such, merely by adding a lamp 60 to the room décor within the user's home, local broadcast television programming is received and provided to the display device without running wires. The antenna 10 may be positioned within the user's home at a location where reception is better, such as near a window or within an upstairs bedroom, while the television 18 may be located in a downstairs family room or kitchen and benefit from the better located antenna. The co-location of the antenna 10 and base unit electronics 74 with the tuner and demodulator 36 in the lamp 60 provides the improvements already mentioned.

Figure 4:
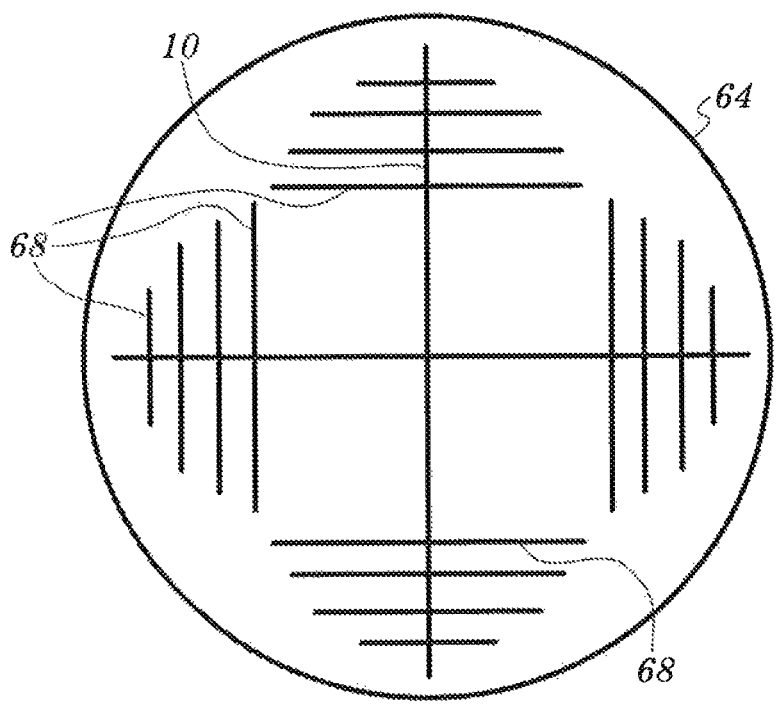
FIG. 4 is a top cross-sectional view of the lamp shade of the lamp of FIG. 3 showing the antenna therein.

In FIG. 4, the lamp shade 64 is generally circular in shape in a top view and encloses within the lamp shade the antenna 10 with the antenna arms extending outward in four directions from a central axis, each arm including an array of antenna elements 68. Other shapes and configurations of lamps and antennas are of course possible.

Figure 5:
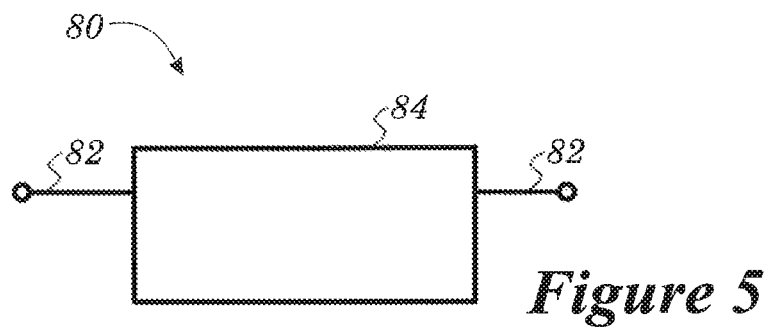
FIG. 5 is a side view of an alternate embodiment of a wireless antenna unit of the present invention.
Figure 6:
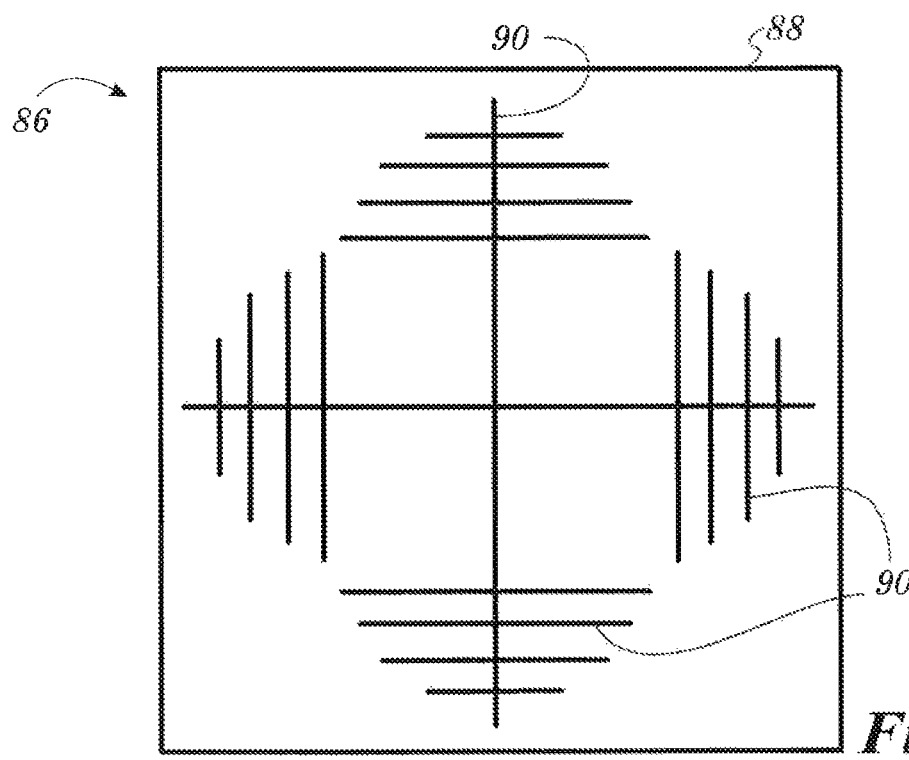
FIG. 6 is a top cross-sectional view of a further embodiment of a wireless antenna unit.
Figure 7:
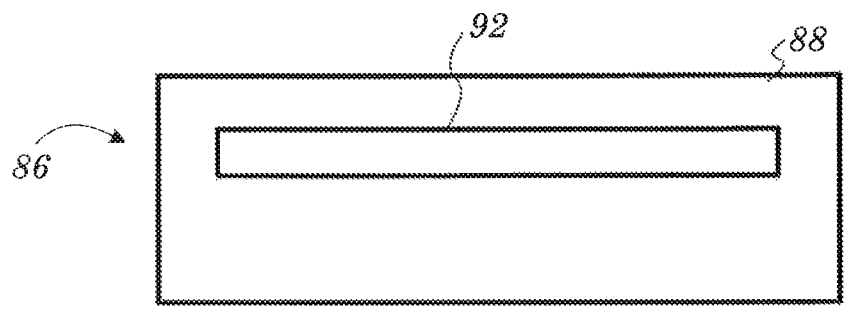
FIG. 7 is a side cross-sectional of the wireless antenna unit of FIG. 6.

An alternative embodiment of the antenna 10 and co-located base unit 12 is shown in FIGS. 5, 6 and 7. A side view of an antenna module 80 is shown in FIG. 5. The antenna module 80 may include antenna elements 82 extending from a housing 84. The housing 84 encloses the antenna interface, tuner, and demodulator, processor, network interface, possibly a cellular communication interface and other elements for its operation. The antenna elements 82 extend horizontally from the housing 84 in the illustration, although they may extend at an angle, or may be movable to different positions by the user or under control of the processor. More or fewer antenna elements may extend from the housing, depending on the embodiment.

Figure 8:
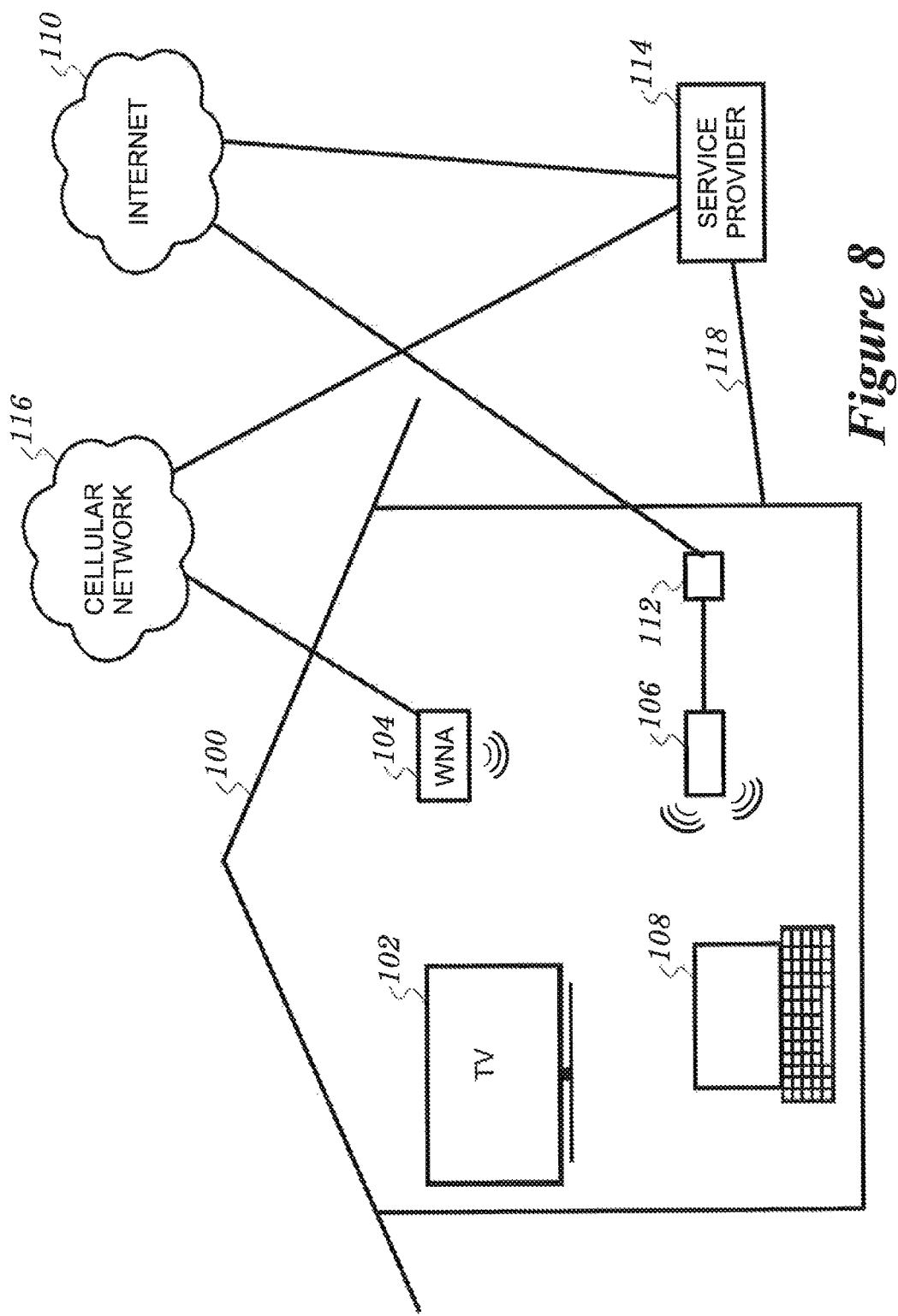
FIG. 8 is a schematic representation of one example of communications pathways that may be used in the method and apparatus of an embodiment of the present invention.

In FIG. 6 is a top view of an alternate embodiment of a wireless network antenna unit 86. The wireless antenna unit 86 has a housing 88 within which or on which is an antenna array 90. Preferably, the antenna array 90 is provided at the top of the housing 88, either on the outside of the housing 88 or just within the top of the housing. In the illustrated embodiment, the antenna array 90 is a 4 element Yagi antenna array, although other antenna configurations can be used. The antenna array 90 is provided as a phased array whose receiving direction can be controlled by the processor by activating the different elements in appropriate combinations. FIG. 7 is a side view of the housing 88 of the wireless antenna unit 86. A tuner and demodulator module 92 is shown within the housing 88 by which the signals received by the antenna 90 are tuned and demodulated. The tuner and demodulator module 92 are thereby co-located with the antenna 90. As before, the antenna interface 30, the processor 38, and the network interface 46 may also be co-located with antenna 90. Other steerable antenna configurations are known in the art and may be used FIG. 8 shows a user's home 100 in which the user has a television 102 on which the user desires to watch local broadcast programming as well as to watch expanded television programming such as is available currently via a cable television provider or satellite television provider, but without requiring that the user purchase both local and expanded television programming from the provider. The user obtains a wireless network antenna 104 which is located at the user's home 100, such as in an upstairs room or near a window, for example. The user's home 100 has a wireless router 106 that establishes a wireless network within the home 100. The television 102 of a preferred embodiment is capable of receiving television programming signals over the wireless network, either by a network interface built into the television 102 or by an add-on network interface or another device connected to the television 102 that has a network interface. An alternate embodiment provides a wired connection from the router 106 to the television 102.

The wireless network antenna 104 receives broadcast television programming, tunes and demodulates the programming signal, formats the programming signal for transmission over the wireless network, and then communicates the network formatted television signal via the network to the television 102. The user is thereby able to view local broadcast programming as received on the remotely located wireless network antenna 104 on the television 102 without requiring amplification or other processing of the signal received by the antenna prior to tuning and demodulation.

The user may also have in the home 100 another device 108, such as a computer, smart phone or other device that communicates on the wireless network established by the router 106. The device 108 may be used to control the router 106 and may also be used to communicate with the wireless network antenna 104 via the network. The other device 108 may also be used to watch the television programming.

In addition to the television programming provided by the wireless network antenna 104 and the communications with the computer or other device 108, the network may carry information from the Internet 110 that is provided to the router 106 via a modem 112. Television programming for extended channels or programs may be available via the Internet so that the user may be able to watch programming received in the home 100 via the modem 112, and provided via the router 106 to the television 102. However, much of the desired extended programming, such as sports channels, educational programming, premium channels, or other extended programming, may be restricted so that the user does not have free access.

A service provider 114 provides access to the extended television programming for the user. The service provider 114 communicates with the wireless network antenna 104 via, for example, a cellular telephone network 116. The service provider 114 communicates with the antenna device 104 to determine which broadcast programs are capable of being received by the antenna 104. If the service provider 114 determines that the broadcast programming desired by the user is capable of being received by the antenna 104, the service provider communicates this finding to the user as indicated at 118. The communication 118 may be by mail, telephone, electronic correspondence or otherwise.

The service provider 114 authorizes access for the user to the extended programming. The extended programming is provided via the Internet 110 to the home 100. The service provider 114 may either supply the extended programming to the internet 110 or may provide the necessary authorization for the user to access the extended programming from another source.

For users who live in locations where an adequate number of broadcast programming channels cannot be received by a wireless network antenna 104, the service provider 114 determines that the user does not qualify for the service by polling the antenna 104 via the cellular network 116. Instead of the cellular network 116, other communication channels between the service provider 114 and the antenna 104 may be used, including use of the internet connection via the router 106 and modem 112 or some other communication channel. The service provider 114 reports the findings of the inquiry to the user via the communication link 118, informing the user that they do not qualify for the service.

By the present system and method, a user may receive both local broadcast programming and extended programming without subscribing to a cable television service or a satellite television service.

Content providers with "cord cutting" business models could benefit from the use of a wireless network antenna (WNA) by shipping a low cost antenna and network device to potential customers and having the device do a reception scan for broadcast television signals detected by the antenna. The results of the reception scan can be reported back to the content provider over a built-in internet link via the network interface. Higher customer satisfaction could be gained by pre-qualifying customers and eliminating reception issues before service start up.

The device described above, in an alternate embodiment, is augmented with additional features that could help to improve reception. The wireless network antenna (WNA) of one embodiment uses information like IP address location information to help determine its location. A great deal of accuracy is not needed but a general location would help the internet connected devices or other WAN (wide area network) network devices to determine the channels and frequencies available for that area. The WAN connected devices could use "white space" databases not for their intended uses, to determine what frequencies to avoid hut for the reverse roles of knowing what frequencies are available in particular areas. Knowing the available frequencies could allow the wireless network antenna (WNA) to concentrate on improving reception on known existing channels rather than trying to learn channels that do not exist.

Figure 9:
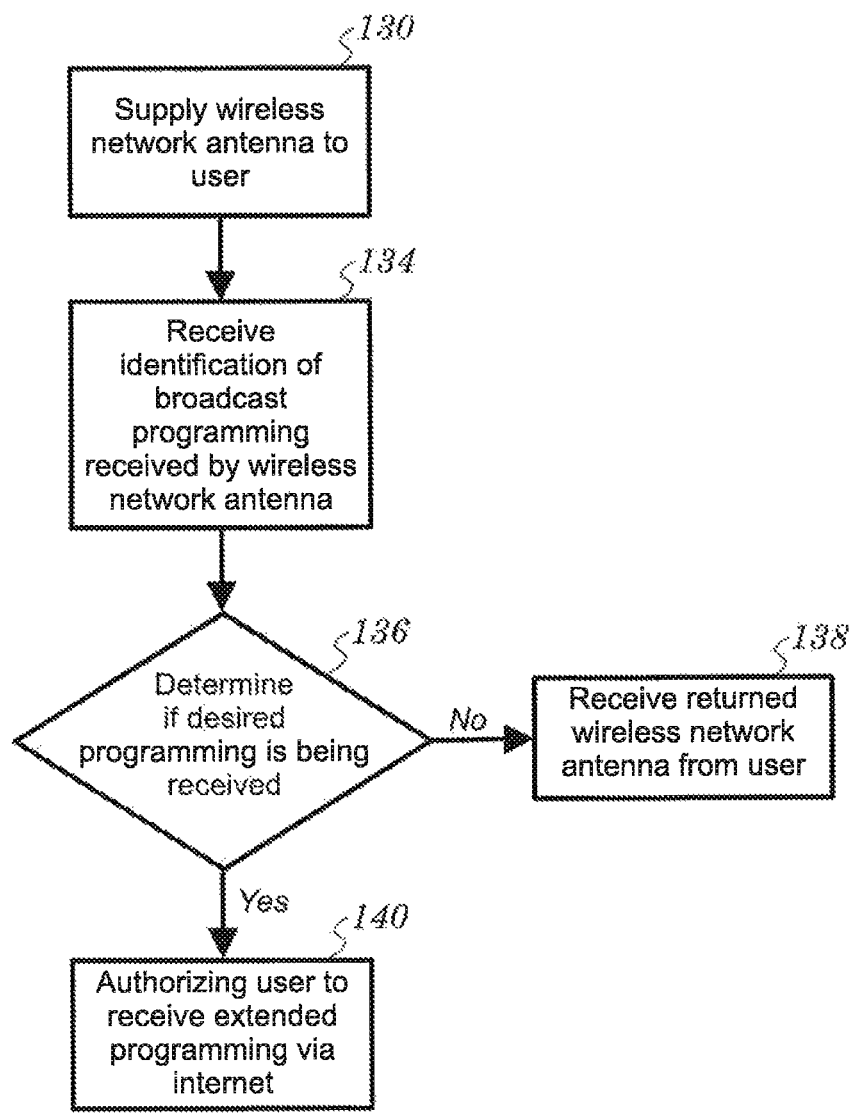
FIG. 9 is a flow chart illustrating a method according to the present invention.

Referring to FIG. 9, a method is shown wherein a service provider or other entity supplies a wireless network antenna to a user, at step 130. The antenna is installed and turned on at the user's location, which may be the user's home. The user's location may also be an office or other location. The service provider or other entity forwards an inquiry to the wireless network antenna to determine which broadcast channels the antenna is capable of receiving at the user's location, at step 132. The antenna scans the available broadcast signals and sends a response to the communication inquiry to the service provider or other entity, who receives an identification of the broadcast programming received by the antenna, at step 134. In an alternative embodiment, the antenna generates an asynchronous message reporting the received broadcast programming, such as by initiating and transmitting the report without first receiving an inquiry communication from the service provider.

The service provider or other entity determines if local programming is available via the broadcast signals from the user's location, at step 136. The determination may require that all local broadcast channels be capable of being received, or may determine that less than all the channels are received. For example, the user may have a preference for one or more local channels. If the desired local programming is not capable of being received from the user's location, the user may return the wireless network antenna to the service provider at step 138. The service provider may request a return of the antenna from the user. A service installer may bring the antenna to the user's home, operate the antenna to determine if the desired channels can be received and may take the antenna away if the desired programming cannot be received or leave the antenna at the user's location if the desired channels can be received.

If the determining step 136 finds that the antenna can receive the desired local broadcast programming, the service provider or other entity may authorize the user to access extended programming such as premium channels or sports channels via the Internet at step 140, so as to compliment the broadcast programming. The extended programming may be provided by the service provider or access to the extended programming by the user may be authorized by the service provider. Alternately, the extended programming may be obtained by the user via a source other than the service provider or other entity.

Figure 10:
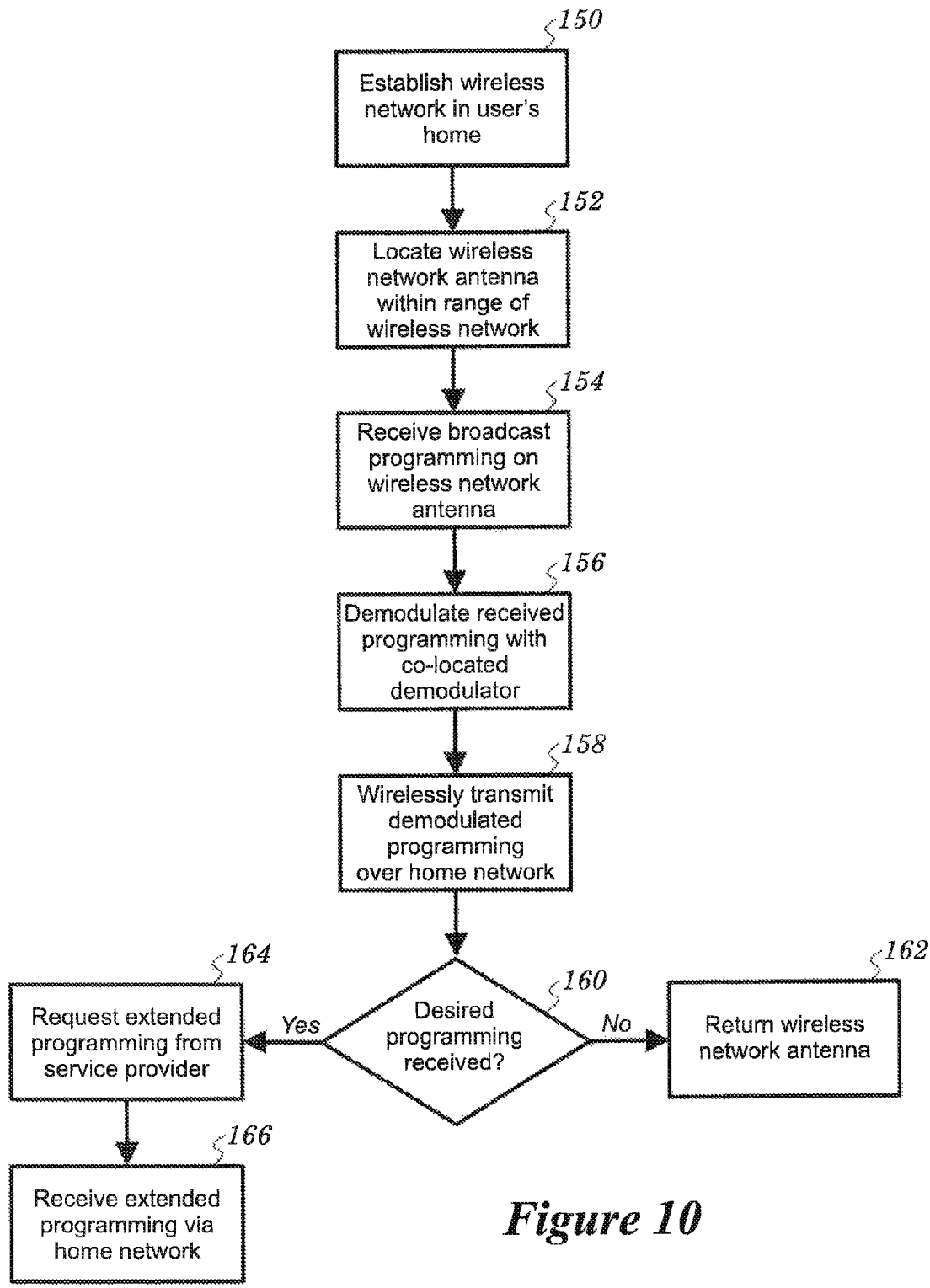
FIG. 10 is a further flow chart illustrating another embodiment of the present method.

In FIG. 10, a step 150 establishes a wireless network at the user's home. The wireless network antenna is located within range of the wireless network, at step 152. Broadcast programming is received by the wireless network antenna at step 154. A tuner and demodulator that are co-located with the antenna operate to demodulate the received signal stream at step 156. The network interface that is co-located with the antenna accesses the network and transmits the demodulated programming stream onto the wireless home network at step 158.

As noted above, the user may be located in an area where the desired broadcast programming cannot be received. If the user, or the service provider, determine that the desired programming is not being received, as shown at step 160, the wireless network antenna is returned to the service provider at step 162.

If the user is located in an area where the desired broadcast local programming can be received by the antenna as determined at step 160, the user may request that the service provider provide access to, authorize access to, extended programming such as premium channels or sports channels at step 164. The preferred embodiment provides that the user receives the extended programming via the user's home network, at step 166, such as by connection to an Internet source or sources for the extended programming.

Thus, there is shown and described a broadcast television reception system and method having an antenna with an antenna interface and a tuner and demodulator that is located at or near the antenna. The antenna and its co-located devices also include a network interface that communicates with a network, such as a home network, so that television sets, portable devices and other such devices that are connected to the network are able to receive and display the broadcast television programming. The antenna can be located at a desirable location with good signal reception and the television set can be located at a desirable location for viewing, without requiring a compromise in either function and without requiring a wired connection between the antenna and television. Also, the operation of the antenna may be controlled in response to signals from the tuner and demodulator.

Although other modifications and changes may be suggested by those skilled in the art, it is the intention of the inventors to embody within the patent warranted hereon all changes and modifications as reasonably and properly come within the scope of their contribution to the art.

I claim:

1. A method for providing television programming to a user, comprising:
    providing a wireless network antenna to a user wherein the wireless network antenna is capable of receiving broadcast television programming, the wireless network antenna being steerable, and also providing a tuner and demodulator and a network interface, the tuner and demodulator and the network interface being enclosed within a housing co-located with the wireless network antenna, the wireless network antenna being operable to produce a digital television signal transport stream for transport over a wireless network from received broadcast television programming;
    receiving an identification of broadcast television programming received by the wireless network antenna, the broadcast television programming received by the wireless network antenna being first television programming;
    making available second television programming to the user, said second television programming not being capable of being received by the wireless network antenna at the user's location;
    determining if the first television programming corresponds to a predetermined set of television programming; and
    providing the second television programming only if said determining step determines that the first television programming does not correspond to the predetermined set of television programming.

2. A method as claimed in claim 1, wherein said first programming is local broadcast television programming, and wherein said second television programming is extended television programming.

3. A method as claimed in claim 1, wherein said step of providing the second television programming to the user includes authorizing user access to the second television programming via the Internet.

4. A method as claimed in claim 1, wherein the step of receiving the identification of television broadcast programming includes receiving the identification of television broadcast programming via a cellular telephone network.

5. A method for receiving television programming at a user's home, comprising:
    connecting a wireless network antenna to a wireless network at the user's home;
    receiving local broadcast television programs on the wireless network antenna at the user's home;
    tuning and demodulating a selected one of the received local broadcast television programs by a tuner and demodulator co-located with the wireless network antenna;
    steering the wireless network antenna to increase a reception parameter of the selected television program of the local broadcast television programs by an antenna interface co-located with the antenna and the tuner and demodulator;
    generating television signal transport stream from the selected television program;
    wirelessly transmitting the television transport stream via the wireless network to a television or display; and
    wirelessly transmitting to a service provider an identification of television programming capable of being received by the wireless network antenna at the user's home.

6. A method as claimed in claim 5, wherein said step of wirelessly transmitting includes transmitting an identification of the television programming capable of being received at the user's location by a cellular telephone network.

7. A method for receiving television programming at a user's home, comprising the steps of:
    connecting a wireless network antenna to a wireless network at the user's home;
    receiving local broadcast television programs on the wireless network antenna at the user's home;
    tuning and demodulating a selected one of the received local broadcast television programs by a tuner and demodulator co-located with the wireless network antenna;
    generating television signal transport stream from the selected television program;
    wirelessly transmitting the television transport stream via the wireless network to a television or display; and
    wirelessly transmitting to a service provider an identification of television programming capable of being received by the wireless network antenna at the user's home.

8. A method for receiving television programming at a user's home, comprising the steps of:
    connecting a wireless network antenna to a wireless network at the user's home;
    receiving local broadcast television programs on the wireless network antenna at the user's home;
    tuning and demodulating a selected one of the received local broadcast television programs by a tuner and demodulator co-located with the wireless network antenna;
    steering the wireless network antenna to increase a reception parameter of the selected television program of the local broadcast television programs by an antenna interface co-located with the antenna and the tuner and demodulator;
    generating a television signal transport stream from the selected television program;
    wirelessly transmitting the television transport stream via the wireless network to a television or display;
    the steerable antenna being enclosed within a decorative enclosure for integration into a home décor;
    the decorative enclosure including lamp elements mounted in the decorative enclosure to provide a lamp; and
    the lamp comprising a reading lamp and the steerable antenna being disposed within a lamp shade of the reading lamp.

9. An apparatus for receiving and distributing a television signal, comprising:
    a wireless bi-directional home IP network;
    an antenna;
    a tuner which selects only one broadcast television channel from a plurality of channels and a demodulator which demodulates a digital television signal received over said only one selected channel, said demodulator producing a single digital television signal transport stream corresponding to said demodulated digital television signal, the tuner and demodulator being in a common housing and not at a remote television, and the antenna being located at the housing;

a wireless bi-directional IP network interface also in the common housing with the tuner and demodulator, the IP network interface wirelessly communicating via the home IP network the single digital television signal transport stream to at least one of said remote television and a remote handheld device not located at said common housing and also in wireless communication with the wireless home IP network;

a processor also in the common housing with the tuner, demodulator, and said wireless IP network interface, the processor being operable to generate a tuner control signal, said processor being in communication with the tuner to control selection of said one selected channel only;

the bi-directional IP network interface and the bi-directional home IP network providing bi-directional communication so that the processor receives a signal from said at least one of said remote television and said remote handheld device for generating the tuner control signal to select said one channel only from said plurality of channels;

a cellular telephone network interface connected to said processor providing communication with a service provider via a cellular telephone network; and said processor being configured to receive via said cellular telephone network from said service provider a set of channels for use by said processor in determining whether all of said set of channels are received by said antenna.

10. The apparatus according to claim 9 wherein both said remote television and said remote handheld device receive said digital television signal transport stream.

11. The apparatus of claim 9 wherein the antenna is a steerable antenna, and said processor also being operable to generate antenna steering control signals.

12. The apparatus of claim 9 wherein the tuner, the demodulator, the processor, and the wireless IP network interface co-located with the antenna are all located in a common housing.

13. The apparatus of 9 wherein the processor provides a gain adjustment signal for controlling a gain of the tuner and the demodulator.

14. A method for receiving and distributing a television signal, comprising the steps of:
providing a wireless bi-directional home IP network;
providing an antenna;
providing a tuner, a demodulator, a processor connected to a cellular telephone network to access a service provider, and a wireless bi-directional IP network interface all co-located with the antenna;
providing at least one of a remote television and a remote hand held device in wireless communication with the wireless home IP network;
with said tuner selecting only one broadcast digital television signal corresponding to only one selected channel from a plurality of channels;
demodulating with said demodulator only said one selected channel to produce a single digital television signal transport stream corresponding to said one channel only, said processor controlling selection of said single channel only;
with the bi-directional IP network interface and the bi-directional home IP network providing bi-directional communication so that the processor receives a signal from said at least one of said remote television and said remote hand held device for generating a tuner control signal for selection by said tuner of said one channel only from said plurality of channels;
accessing said service provider via said processor and said cellular telephone network; and
said processor being configured to receive via said cellular telephone network from said service provider a set of channels for use by said processor in determining whether all of said set of channels are received by said antenna.

15. The apparatus of claim 9 wherein said service provider is also connected to said home IP network through internet.

16. The method of claim 14 wherein said service provider is also connected to said home IP network through internet.

* * * * *